April 10, 1962 R. E. GUILLAUMANT 3,028,972
UTENSIL SUPPORT
Filed June 22, 1959
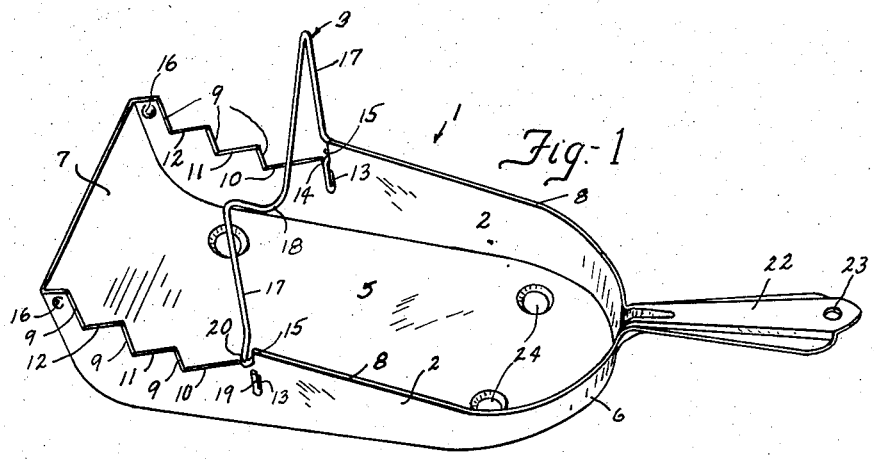
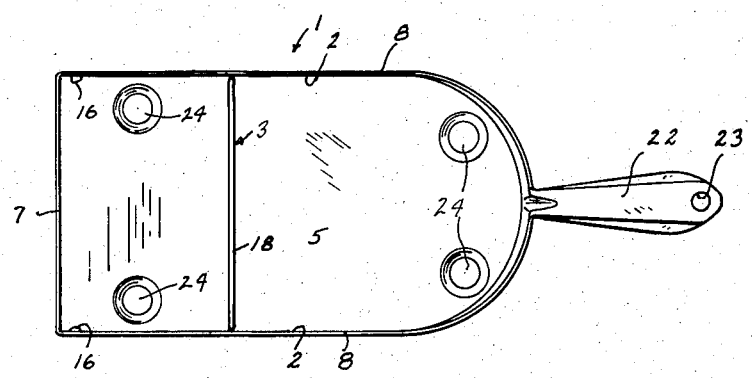
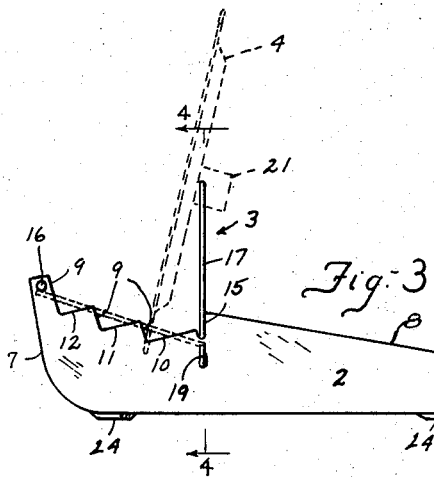
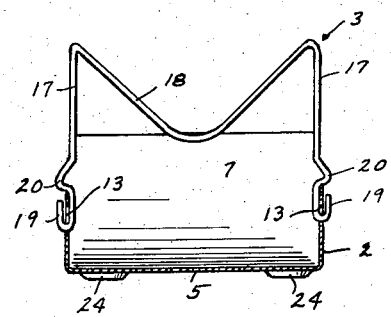
INVENTOR.
ROGER E. GUILLAUMANT
BY
ATTORNEY United States Patent Office 3,028,972
Patented Apr. 10, 1962

3,028,972
UTENSIL SUPPORT
Roger E. Guillaumant, 813 Mound St., Valparaiso, Ind.
Filed June 22, 1959, Ser. No. 822,099
2 Claims. (Cl. 211—41)

This invention relates generally to a kitchen utensil and more particularly is directed to a device which jointly serves as a holder for various items, such as pan covers and spoons and as a receptacle for any drippings or other material released from such items when they are positioned on the device. In other words, the device is primarily utilized as a holder for various utensils employed while cooking so that any food released from the utensils will fall into the receptacle and thereby protect a counter or work space from getting smeared with grease or sticky food material.

With the above in mind, the device is designed and constructed to comprise an elongate relatively shallow receptacle or tray provided at one extremity with a plurality of seats or lands, and a movable support or abutment which may be adjusted to an upstanding position in spaced relation to the seats in a manner whereby a cover may be placed on the seats and leaned against the support so that, for example, any drippings or moisture resulting from cooking which has accumulated on the underside of the cover may drip or run down into the receptacle. A plurality of seats or lands are provided so that several covers may be respectively mounted thereon and leaned against one another.

An important object of the invention is to provide a support for the above purpose which is preferably made in the form of a resiliently flexible arched shaped member having legs operatively connected to sides of the receptacle and a bridge which joins the legs and serves as a handle.

A significant objective of the invention is to provide a device of the kind above described in which the receptacle includes side walls provided with means of a predetermined character for receiving the lower ends of the legs of the support in a manner whereby the support may be adjusted and held in an upstanding position or adjusted to a collapsed or substantially horizontal position upon the receptacle.

A specific object of the invention is to provide a receptacle in which the side walls are preferably provided with abutments so that the legs of the support may be pressed or snapped thereunder to detachably lock the support in the substantially horizontal position above referred to. In other words, the support can be adjusted either to an upstanding operative position for supporting one or more covers or to an inoperative position to reduce the overall height of the device.

Additional objects reside in providing a device which can be economically manufactured on a production basis, and is durable and efficient for the uses intended.

Other objects and advantages of the invention will become apparent after the description hereinafter set forth is considered in conjunction with the drawings annexed hereto.

In the drawings:
FIGURE 1 is a perspective view of the device showing the support adjusted to an upstanding position;
FIGURE 2 is a top view of the structure depicted in FIGURE 1;
FIGURE 3 is a side elevational view of the structure illustrated in FIGURES 1 and 2, with the support also shown in a lower position; and
FIGURE 4 is a transverse section taken substantially on line 4—4 of FIGURE 3.

Referring to the drawings, numeral 1 generally designates an elongate receptacle or tray having upturned parallel side walls 2 provided with a plurality of seats or lands at one extremity of the receptacle and 3 generally designates a support against which a cover 4 may lean when mounted on a pair of the seats.

The receptacle may be designed and constructed in various ways but as exemplified includes a flat bottom wall 5, the side walls 2 which merge with a rear curved end wall 6 and a front curved end wall 7. The front wall 7 is curved or inclined toward the bottom wall and constitutes a continuation thereof so that any drippings from the cover 4 will run toward the bottom wall. The side walls taper generally toward the rear end wall to provide upper straight inclined marginal edges 8 adjacent one extremity of the receptacle and the side walls adjacent the opposite extremity are preferably interrupted by V-shaped notches to provide pairs of stops 9, a pair of seats 10, a pair of seats 11 spaced from the pair 10 and a pair of seats 12 spaced from the pair 11. It will be noted that the seats are disposed in a parallel relationship and that the stops 9 are arranged in a parallel relationship transverse to the seats and that the seats and stops are inclined with relation to the plane of the bottom wall of the receptacle.

The side walls of the receptacle adjacent the pair of seats 10 are provided with a pair of vertical guides preferably in the form of openings or slots 13 and a pair of vertical notches 14 located above and in spaced relation to the slots. It will be noted that the marginal edge portions of the side walls incline upwardly toward the upper edge of the front wall and terminate in vertical edges or abutments 15 and constitute continuations of edges defining a side of each of the notches 14. The slots and notches comprise the receiving means above referred to.

The side walls are of a resiliently flexible character and further provided with a pair of indentations or dimples 16 forming abutments located at the high point of the side walls adjacent the front wall 7 for engagement with the support 3 as will be subsequently described.

The support, as stated above, may be designed and constructed in various ways but as exemplified is preferably made in the form of a resiliently flexible wire arch or bail comprising a pair of legs 17 and a generally V-shaped bridge portion 18. The legs are respectively provided with portions or hooks 19 which are caught in the slots 13 with portions of the legs straddling the side walls of the receptacle. The legs are also respectively provided with outturned portions or abutments 20. The connection between the legs of the support and the receptacle is such that the support can be readily adjusted by moving the hooks downwardly in the slots so that the abutments 20 will fit into the notches 14 and engage the abutments 15 to hold or lock the support in the upstanding full line position illustrated. The support may also be adjusted by lifting it up so that the abutments 20 will clear the notches 14 and thereby permit one to swing or pivot the support downwardly into the receptacle and more or less in alignment with the seats and stops, as shown in FIGURE 3. Due to the resiliently flexible character of the side walls of the support and/or the resiliently flexible character of the support the legs of the support can be pressed into a locked collapsed condition under the abutments 16 or released therefrom by merely lifting up on the support.

In view of the foregoing, it will be manifest that the support is slidably and pivotally mounted on the receptacle and that when the support is raised to the upstanding position the cover 4 may be placed on the pair of seats 10 and leaned against the support or abutment 3 as exemplified in FIGURE 3. A cover of any size or shape may, of course, be mounted on either of the pairs of seats 11 and 12. For example, a large cover having a relatively thick rim may be mounted on the outermost seats 12. If desired, additional covers may be respectively placed on the pairs of adjacent seats 11 and 12 and leaned against the cover 4. The stops 9 adjacent the seats stabilize the positions of the covers by preventing their lower portions from sliding forwardly and the bridge 18 is preferably V-shaped as shown to provide clearance for a knob 21 on the cover 4 so that the upper portion of this cover will engage the support at spaced locations in order to further stabilize the position of the cover. In other words, the periphery of the cover 4 is supported at four circumferentially spaced locations thereon. It will be noted that a portion of the rim of the cover will extend into the receptacle and offers clearance so that the covers will rest only on the seats.

Attention is directed to the fact that the device may be utilized to support utensils such as covers and/or one or more utensils such as forks, spoons or knives, the latter of which can be placed in the receptacle so that the rear end wall 6 and/or side walls 2 will support the same at a convenient height for grasping by the hand. The receptacle thus offers a setup whereby the drippings from the aforesaid items will be received in the receptacle. The items, such as forks, knives and spoons, may be mounted on the device at the same time that the covers are carried thereby or if desired, the device may be used for such items only after the support is lowered. It should also be obvious that a small can, bottle or jar containing a spillable or sticky food product may be placed in the receptacle to protect a counter or work space from such a product. The device may also be used for the orderly storage of covers in a cupboard.

The receptacle is preferably constructed in one-piece from a suitable material such as a durable moulded plastic or it may be stamped from sheet material such as stainless steel. The support may also be constructed from such material. The receptacle is preferably provided with a handle 22 with a hole 23 therein to facilitate manipulation of the device and support thereof on a hook or nail. The handle is preferably formed into a channel and joined or merged into the rear end wall 6 to impart rigidity to the handle. The bottom wall may be provided with legs 24 which are preferably formed by indenting or forming circular depressions therein.

Having thus described my invention, it is obvious that various modifications may be made in the same without departing from the spirit of the invention, and, therefore, I do not wish to be understood as limiting myself to the exact form, construction, arrangement and combination of parts herein shown and described.

I claim:

1. A device of the kind described comprising an elongate receptacle and a rest; said receptacle having a substantially planar bottom, a pair of substantially parallel upstanding side walls, a curved upstanding rear wall having a handle extending therefrom and a curved upturned front wall of a height greater than that of said rear wall, said side walls being provided with vertical slots located intermediate their length and seats above the slots with abutments extending upwardly from said seats, said side walls being tapered from said abutments toward said rear end wall and provided with notches between said slots and said front wall; said rest comprising a pair of depending legs and a bridge joining the legs, said legs having portions extending through said slots and outturned offsets spaced from said portions disposed in said seats and engaging said abutments for maintaining said rest in a substantially vertical position so that an article can be supported in a pair of said notches and leaned against said rest; said rest being manually liftable to release said offsets from said seats and abutments so that it may be pivoted downwardly in only one direction to a substantially horizontal position in relation to said notches.

2. The device defined in claim 1, including means for detachably detaining said rest in said substantially horizontal position.

References Cited in the file of this patent

UNITED STATES PATENTS

| D. 161,899 | Brooks | Feb. 13, 1951 |
| 253,461 | Wold | Feb. 7, 1882 |
| 434,829 | Hicks | Aug. 19, 1890 |
| 928,101 | Brakeman | July 13, 1909 |
| 1,889,146 | Kalenoff | Nov. 29, 1932 |
| 2,616,567 | McCulloch | Nov. 4, 1952 |

FOREIGN PATENTS

| 118,370 | Sweden | Mar. 18, 1947 |
| 217,399 | Great Britain | June 19, 1924 |
| 594,172 | Great Britain | Nov. 4, 1947 |
| 753,787 | France | Aug. 21, 1933 |